United States Patent
Wakabayashi et al.

(10) Patent No.: US 9,407,052 B2
(45) Date of Patent: Aug. 2, 2016

(54) AMPLIFIER, LASER APPARATUS, AND EXTREME ULTRAVIOLET LIGHT GENERATION SYSTEM

(71) Applicant: GIGAPHOTON INC., Tochigi-ken (JP)

(72) Inventors: Osamu Wakabayashi, Tochigi-ken (JP); Krzysztof Nowak, Tochigi-ken (JP)

(73) Assignee: GIGAPHOTON INC., Tochigi-ken (JP)

( * ) Notice: Subject to any disclaimer, the term of this patent is extended or adjusted under 35 U.S.C. 154(b) by 0 days.

(21) Appl. No.: 14/455,701

(22) Filed: Aug. 8, 2014

(65) Prior Publication Data

US 2014/0341248 A1 Nov. 20, 2014

Related U.S. Application Data

(63) Continuation of application No. PCT/IB2013/000181, filed on Feb. 13, 2013.

(60) Provisional application No. 61/618,296, filed on Mar. 30, 2012.

(30) Foreign Application Priority Data

Dec. 12, 2012  (JP) ................ 2012-271082

(51) Int. Cl.
    *H01S 3/223*     (2006.01)
    *H01S 3/23*     (2006.01)
    *H01S 3/00*     (2006.01)
    *H05G 2/00*     (2006.01)

(52) U.S. Cl.
CPC ............... *H01S 3/005* (2013.01); *H01S 3/2316* (2013.01); *H01S 3/2232* (2013.01); *H01S 3/2333* (2013.01); *H05G 2/008* (2013.01)

(58) Field of Classification Search
CPC ......... H01S 3/03; H01S 3/034; H01S 3/2232; H01S 3/2308; H01S 3/2316
See application file for complete search history.

(56) References Cited

U.S. PATENT DOCUMENTS

| | | | |
|---|---|---|---|
| 3,566,128 A * | 2/1971 | Arnuad | H01S 3/08 359/346 |
| 5,574,328 A | 11/1996 | Okuchi | |
| 6,173,000 B1 | 1/2001 | Balla | |
| 6,665,327 B1 | 12/2003 | von Borstel et al. | |
| 2008/0069157 A1 | 3/2008 | Ariga et al. | |
| 2008/0087847 A1* | 4/2008 | Bykanov et al. | 250/504 R |

(Continued)

FOREIGN PATENT DOCUMENTS

| | | |
|---|---|---|
| EP | 0732168 A2 | 9/1996 |
| JP | 2009-026854 A | 2/2009 |

(Continued)

OTHER PUBLICATIONS

Website https://www.thorlabs.com/newgrouppage9.cfm?objectgroup_id=5229 (accessed Jun. 12, 2015).*
Notification Concerning Transmittal of International Preliminary Report on Patentability; International Preliminary Report on Patentability; and Written Opinion, issued in PCT/IB2013/000181, dated Oct. 9, 2014.

(Continued)

*Primary Examiner* — Eric Bolda
(74) *Attorney, Agent, or Firm* — Studebaker & Brackett PC (57) ABSTRACT

An amplifier may include a plurality of discharge tubes arranged in a designed path of a seed laser beam and an optical system arranged to steer the seed laser beam to travel along the designed path.

14 Claims, 8 Drawing Sheets

(56) References Cited

U.S. PATENT DOCUMENTS

| | | |
|---|---|---|
| 2009/0232171 A1 | 9/2009 | Abe et al. |
| 2009/0316746 A1 | 12/2009 | Nowak et al. |
| 2010/0193710 A1 | 8/2010 | Wakabayashi et al. |
| 2012/0170013 A1* | 7/2012 | Tsuji ............................. 355/67 |

FOREIGN PATENT DOCUMENTS

| | | |
|---|---|---|
| WO | 2008/061516 A1 | 5/2008 |
| WO | 2009/136393 A1 | 11/2009 |
| WO | 2011/115025 A1 | 9/2011 |

OTHER PUBLICATIONS

International Search Report and Written Opinion issued in International Application No. PCT/IB2013/000181 dated Nov. 22, 2013.

An Office Action; "Notice of Reason for Rejection," issued by the Japanese Patent Office on May 17, 2016, which corresponds to Japanese Patent Application No. 2012-271082 and is related to U.S. Appl. No. 14/455,701; with English language translation.

* cited by examiner

AMPLIFIER, LASER APPARATUS, AND EXTREME ULTRAVIOLET LIGHT GENERATION SYSTEM

CROSS-REFERENCE TO RELATED APPLICATIONS

The present application is a continuation of International Application No. PCT/IB2013/000181, filed on Feb. 13, 2013, which claims the benefit of U.S. Provisional Patent Application Ser. No. 61/618,296 filed Mar. 30, 2012, and Japanese Patent Application No. 2012-271082 filed Dec. 12, 2012, the disclosures of which are incorporated herein by reference.

BACKGROUND

1. Technical Field

The present disclosure relates to amplifiers, laser apparatuses, and extreme ultraviolet (EUV) light generation systems.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 60 nm to 45 nm, and further, microfabrication with feature sizes of 32 nm or less will be required. In order to meet the demand for microfabrication with feature sizes of 32 nm or less, for example, an exposure apparatus is needed which combines a system for generating EUV light at a wavelength of approximately 13 nm with a reduced projection reflective optical system.

Three kinds of systems for generating EUV light are known in general, which include a Laser Produced Plasma (LPP) type system in which plasma is generated by irradiating a target material with a laser beam, a Discharge Produced Plasma (DPP) type system in which plasma is generated by electric discharge, and a Synchrotron Radiation (SR) type system in which orbital radiation is used to generate plasma.

SUMMARY

An amplifier according to one aspect of the present disclosure may include a plurality of discharge tubes arranged in a designed path of a seed laser beam and an optical system arranged to steer the seed laser beam to travel along the designed path.

A laser apparatus according to another aspect of the present disclosure may include a master oscillator configured to output a seed laser beam and the above-described amplifier.

An extreme ultraviolet light generation system according to yet another aspect of the present disclosure may include the above-described laser apparatus, a chamber provided with an inlet through which a laser beam from the laser apparatus enters the chamber, a target supply device configured to supply a target material into the chamber, and a focusing optical system positioned to focus the laser beam at a predetermined position inside the chamber.

BRIEF DESCRIPTION OF THE DRAWINGS

Hereinafter, selected embodiments of the present disclosure will be described with reference to the accompanying drawings.

DETAILED DESCRIPTION

Hereinafter, selected embodiments of the present disclosure will be described in detail with reference to the accompanying drawings. The embodiments to be described below are merely illustrative in nature and do not limit the scope of the present disclosure. Further, the configuration(s) and operation(s) described in each embodiment are not all essential in implementing the present disclosure. Note that like elements are referenced by like reference numerals and characters, and duplicate descriptions thereof will be omitted herein.

CONTENTS

1. Overview
2. Overview of EUV Light Generation System
   2.1 Configuration
   2.2 Operation
3. Laser Apparatus Including Amplifier
   3.1 Configuration
   3.2 Operation
4. Amplifier Including Discharge Tubes and Reflective Optical System
   4.1 Configuration
   4.2 Operation
   4.3 Specification of Reflective Optical System and Propagation of Laser Beam
   4.4 Concave Mirror for Transferring Image of Point Light Source
      4.4.1 Configuration
      4.4.2 Operation
      4.4.3 Effect
      4.4.4 Other 5. Variations of Amplifier
5.1 Amplifier Including Plane Mirror and Concave Mirror
5.1.1 Configuration
5.1.2 Operation
5.2 Amplifier Including Concave Spherical Mirror
5.2.1 Configuration
5.2.2 Operation
5.3 Amplifier Including Off-Axis Paraboloidal Concave Mirror
5.3.1 Configuration
5.3.2 Operation 1. Overview A high-power $CO_2$ laser apparatus is used as a driver laser for an LPP type EUV light generation apparatus. It is necessary for a driver ($CO_2$) laser apparatus for an LPP type EUV light generation apparatus to output a pulse laser beam having a high pulse energy at a high repetition rate in a low-order-transverse mode (i.e., a low $M^2$ value). Accordingly, a master oscillator (MO) configured to output a pulse laser beam at a high repetition rate and a plurality of amplifiers (PA) configured to amplify the pulse laser beam to output a high-energy pulse laser beam are used. With such MOPA systems, there is demand for improving the amplification efficiency while suppressing deterioration of the $M^2$ factor as the pulse laser beam from the master oscillator MO is amplified. Note that the $M^2$ factor is called the "times diffraction limit" or "beam quality," and the $M^2$ value of a diffraction-limited beam is 1.

Although a fast axial flow amplifier in which $CO_2$ laser gas runs at a high speed through multiple discharge tubes is used as the amplifier PA, it has been difficult to obtain a high amplification efficiency while suppressing deterioration of the $M^2$ factor of the pulse laser beam. For example, deterioration of the $M^2$ factor of the pulse laser beam may be brought about when the wavefront of the pulse laser beam reflected by an optical element provided in the amplifier is distorted or when part of the pulse laser beam is reflected within a discharge tube in the amplifier and the reflected part of the pulse laser beam is amplified.

2. Overview of EUV Light Generation System
2.1 Configuration

Figure 1:
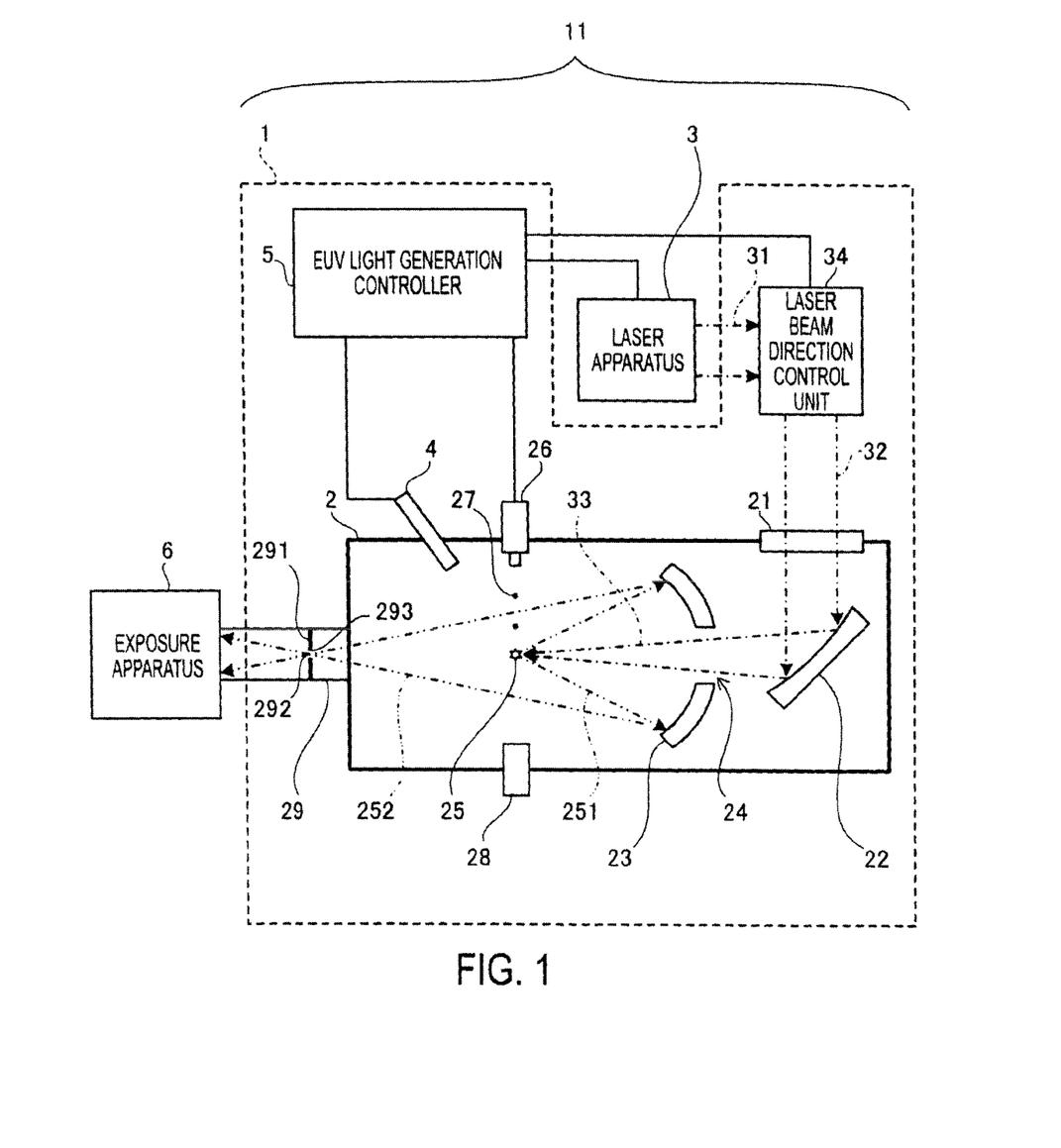
FIG. 1 schematically illustrates an exemplary configuration of an LPP type EUV light generation system.

FIG. 1 schematically illustrates an exemplary configuration of an LPP type EUV light generation system. An EUV light generation apparatus 1 may be used with at least one laser apparatus 3. Hereinafter, a system that includes the EUV light generation apparatus 1 and the laser apparatus 3 may be referred to as an EUV light generation system 11. As shown in FIG. 1 and described in detail below, the EUV light generation system 11 may include a chamber 2 and a target supply device 26. The chamber 2 may be sealed airtight. The target supply device 26 may be mounted onto the chamber 2, for example, to penetrate a wall of the chamber 2. A target material to be supplied by the target supply device 26 may include, but is not limited to, tin, terbium, gadolinium, lithium, xenon, or any combination thereof.

The chamber 2 may have at least one through-hole or opening formed in its wall, and a pulse laser beam 32 may travel through the through-hole/opening into the chamber 2. Alternatively, the chamber 2 may have a window 21, through which the pulse laser beam 32 may travel into the chamber 2. An EUV collector mirror 23 having a spheroidal surface may, for example, be provided in the chamber 2. The EUV collector mirror 23 may have a multi-layered reflective film formed on the spheroidal surface thereof. The reflective film may include a molybdenum layer and a silicon layer, which are alternately laminated. The EUV collector mirror 23 may have a first focus and a second focus, and may be positioned such that the first focus lies in a plasma generation region 25 and the second focus lies in an intermediate focus (IF) region 292 defined by the specifications of an external apparatus, such as an exposure apparatus 6. The EUV collector mirror 23 may have a through-hole 24 formed at the center thereof so that a pulse laser beam 33 may travel through the through-hole 24 toward the plasma generation region 25.

The EUV light generation system 11 may further include an EUV light generation controller 5 and a target sensor 4. The target sensor 4 may have an imaging function and detect at least one of the presence, trajectory, position, and speed of a target 27.

Further, the EUV light generation system 11 may include a connection part 29 for allowing the interior of the chamber 2 to be in communication with the interior of the exposure apparatus 6. A wall 291 having an aperture 293 may be provided in the connection part 29. The wall 291 may be positioned such that the second focus of the EUV collector mirror 23 lies in the aperture 293 formed in the wall 291.

The EUV light generation system 11 may also include a laser beam direction control unit 34, a laser beam focusing mirror 22, and a target collector 28 for collecting targets 27. The laser beam direction control unit 34 may include an optical element (not separately shown) for defining the direction into which the pulse laser beam 32 travels and an actuator (not separately shown) for adjusting the position and the orientation or posture of the optical element.

2.2 Operation

With continued reference to FIG. 1, a pulse laser beam 31 outputted from the laser apparatus 3 may pass through the laser beam direction control unit 34 and be outputted therefrom as the pulse laser beam 32 after having its direction optionally adjusted. The pulse laser beam 32 may travel through the window 21 and enter the chamber 2. The pulse laser beam 32 may travel inside the chamber 2 along at least one beam path from the laser apparatus 3, be reflected by the laser beam focusing mirror 22, and strike at least one target 27 as a pulse laser beam 33.

The target supply device 26 may be configured to output the target(s) 27 toward the plasma generation region 25 in the chamber 2. The target 27 may be irradiated with at least one pulse of the pulse laser beam 33. Upon being irradiated with the pulse laser beam 33, the target 27 may be turned into plasma, and rays of light 51 including EUV light may be emitted from the plasma. At least the EUV light included in the light 251 may be reflected selectively by the EUV collector mirror 23. EUV light 252, which is the light reflected by the EUV collector mirror 23, may travel through the intermediate focus region 292 and be outputted to the exposure apparatus 6. Here, the target 27 may be irradiated with multiple pulses included in the pulse laser beam 33.

The EUV light generation controller 5 may be configured to integrally control the EUV light generation system 11. The EUV light generation controller 5 may be configured to process image data of the target 27 captured by the target sensor 4. Further, the EUV light generation controller 5 may be configured to control at least one of: the timing when the target 27 is outputted and the direction into which the target 27 is outputted. Furthermore, the EUV light generation controller 5 may be configured to control at least one of: the timing when the laser apparatus 3 oscillates, the direction in which the pulse laser beam 33 travels, and the position at which the pulse laser beam 33 is focused. It will be appreciated that the various controls mentioned above are merely examples, and other controls may be added as necessary.

3. Laser Apparatus Including Amplifier

3.1 Configuration

Figure 2:
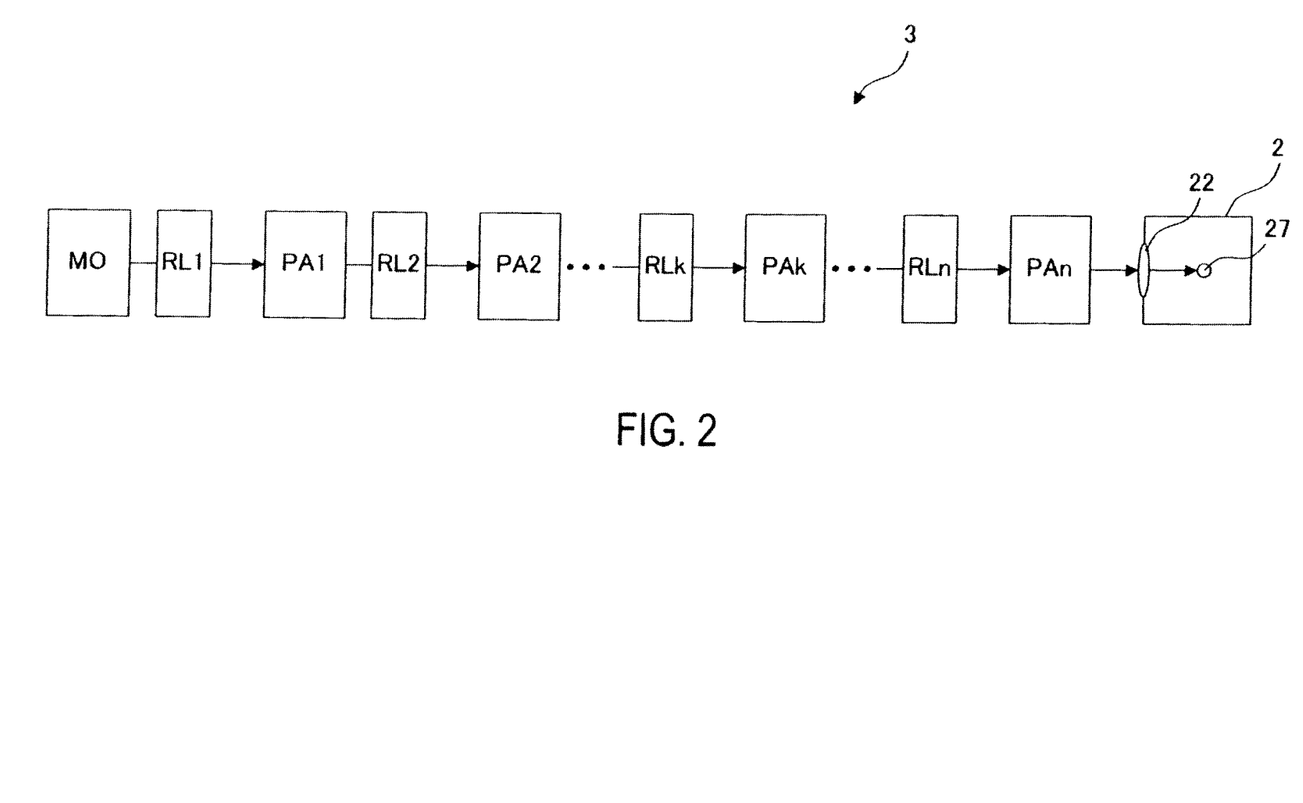
FIG. 2 schematically illustrates an exemplary configuration of a laser apparatus according to one embodiment of the present disclosure.

FIG. 2 schematically illustrates an exemplary configuration of a laser apparatus according to one embodiment of the present disclosure. As shown in FIG. 2, the laser apparatus 3 may include a master oscillator MO, at least one amplifier PA, and at least one relay optical system RL.

The at least one amplifier PA may be provided in a path of a pulse laser beam from the master oscillator MO. The at least one amplifier PA may include a plurality of amplifiers PA1 through PAn, and each of the amplifiers PA1 through PAn may include a plurality of discharge tubes. The discharge tubes may be filled with $CO_2$ gas.

The at least one relay optical system RL may include a plurality of relay optical systems RL1 through RLn. The relay optical system RL1 may be provided between the master oscillator MO and the amplifier PA1 in the path of the pulse laser beam. The relay optical system RL2 may be provided between the amplifier PA1 and the amplifier PA2, and the relay optical system RLk may be provided between the amplifier PA(k−1) and the amplifier PAk. Each of the relay optical systems RL1 through RLn may include a concave mirror.

The master oscillator MO may, for example, be a $CO_2$ laser oscillator in which an EO Pockets cell, a polarizer, and a discharge tube filled with $CO_2$ gas are provided in a laser resonator.

In one embodiment, a semiconductor laser may be used as the master oscillator MO. A quantum cascade laser (QCL) may be used as the master oscillator MO that oscillates in the wavelength band of a $CO_2$ laser. A pulse laser beam may be outputted from a semiconductor laser by controlling a current that flows through the semiconductor. Further, a temperature of the semiconductor may be controlled using a Peltier element to achieve oscillation at the same oscillation wavelength as the $CO_2$ laser medium amplifying line.

3.2 Operation

The master oscillator MO may output a pulse laser beam at a predetermined repetition rate and in a low-order-transverse mode. Here, the low-order-transverse mode may, for example, mean that the master oscillator MO oscillates in a state where $M^2$ is not greater than 2. The amplifiers PA1 through PAn may pump the $CO_2$ laser gas through electrical discharge using an electrical power supply (not separately shown) even when the pulse laser beam from the master oscillator MO is not present in the amplifiers PA1 through PAn.

The pulse laser beam outputted from the master oscillator MO may pass through the relay optical system RL1. In the relay optical system RL1, the pulse laser beam may be converted to have laser beam characteristics suitable for entering the amplifier PAL Here, the laser beam characteristics may, for example, include a beam radius and a wavefront.

The pulse laser beam from the relay optical system RL1 may enter the amplifier PA1 and be amplified when passing through the amplifier PA1.

The pulse laser beam from the amplifier PA1 may then pass through the relay optical system RL2. In the relay optical system RL2, the pulse laser beam may be converted to have laser beam characteristics suitable for entering the amplifier PA2.

The pulse laser beam from the relay optical system RL2 may enter the amplifier PA2 and be further amplified when passing through the amplifier PA2.

Similarly, the pulse laser beam from the amplifier PA2 may pass through the relay optical system RLk. In the relay optical system RLk, the pulse laser beam may be converted to have laser beam characteristics suitable for entering the amplifier PAk.

The pulse laser beam from the relay optical system RLk may enter the amplifier PAk and be further amplified when passing through the amplifier PAk.

The pulse laser beam amplified in the amplifier PAn may then be guided to the chamber 2 in which EUV light may be generated, as shown in FIG. 2.

4. Amplifier Including Discharge Tubes and Reflective Optical System

4.1 Configuration

Figure 3A:
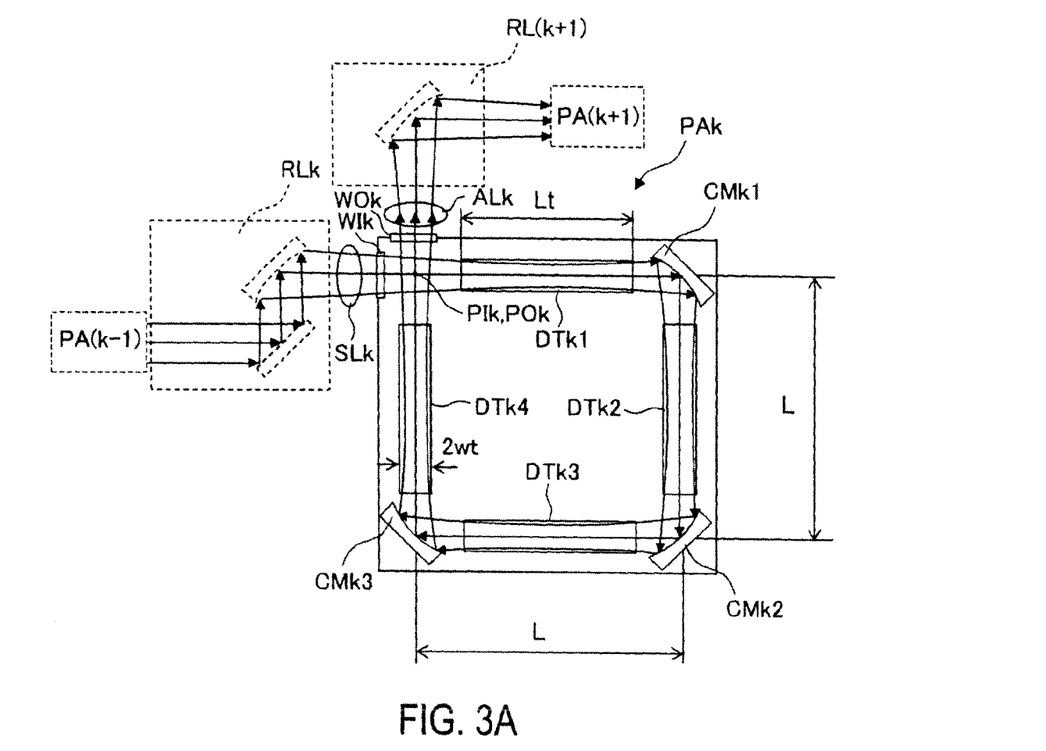
FIG. 3A schematically illustrates an exemplary configuration of an amplifier that includes a plurality of discharge tubes and a plurality of concave mirrors.

FIG. 3A schematically illustrates an exemplary configuration of an amplifier that includes a plurality of discharge tubes and a plurality of concave mirrors.

The amplifier PAk may include discharge tubes DTk1 through DTk4, concave mirrors CMk1 through CMk3, an input window WIk, and an output window WOk.

The discharge tubes DTk1 through DTk4 may be provided in a designed path of a seed laser beam SLk. Each of the discharge tubes DTk1 through DTk4 may be filled with $CO_2$ laser gas. The laser gas may be run along the designed path using blowers (not separately shown).

A pair of electrodes (not separately shown) may be provided on an outer wall of each of the discharge tubes DTk1 through DTk4. The pair of electrodes may be connected to a high-frequency power supply (not separately shown). The discharge tubes DTk1 through DTk4 may have the same length Lt and the same inner radius wt. Each of the discharge tubes DTk1 through DTk4 may be provided so that the axis thereof coincides with the axis of the designed path of the seed laser beam SLk.

The input window WIk may be provided to correspond to a position PIk where the seed laser beam SLk enters the amplifier PAk. The output window WOk may be provided at a position POk where an amplified laser beam ALk exits from the amplifier PAk.

The concave mirror CMk1 may be provided between the discharge tube DTk1 and the discharge tube DTk2, the concave mirror CMk2 may be provided between the discharge tube DTk2 and the discharge tube DTk3, and the concave mirror CMk3 may be provided between the discharge tube DTk3 and the discharge tube DTk4. The concave mirrors CMk1 through CMk3 may be positioned to steer the seed laser beam SLk to follow the aforementioned designed path.

The concave mirrors CMk1 through CMk3 may be supported by respective mirror holders (not separately shown) so that the seed laser beam SLk is incident thereon at an angle of 45 degrees and is reflected thereby at an angle of 45 degrees. The concave mirrors CMk1 through CMk3 may be positioned such that the planes of incidence thereof lie on the same plane. In the configuration shown in FIG. 3A, the aforementioned same plane may be the same as the plane of the paper. The concave mirrors CMk1 through CMk3 may be arranged such that the intervals between the concave mirrors CMk1 and CMk2 and between the concave mirrors CMk2 and CMk3 are the same distance L.

The reflective surfaces of the concave mirrors CMk1 through CMk3 may have shapes that form beam waists in the centers of the respective discharge tubes DTk2 through DTk4 in order to suppress the occurrence of vignetting in the pulse laser beam in the respective discharge tubes DTk2 through DTk4. For example, the concave mirrors CMk1 through CMk3 may have the same reflective surface shapes, which may be spheroidal, toroidal, or the like. The specifications of the concave mirrors CMk1 through CMk3 will be described later.

The relay optical system RLk may be provided between the amplifier PA(k−1) and the amplifier PAk to steer the seed laser beam SLk along a predetermined path. An optical system capable of outputting such a spherical wave that passes through the discharge tube DTk1 and forms a beam waist at a central location in the discharge tube DTk1 may be used as the relay optical system RLk.

For example, the relay optical system RLk may include a plane mirror and a concave mirror. When a plane wave is to be converted into a spherical wave, an off-axis paraboloidal mirror may be used.

A relay optical system RL(k+1) may be provided between the amplifier PAk and an amplifier PA(k+1) in a path of the amplified laser beam ALk.

4.2 Operation

A pulse laser beam from the amplifier PA(k−1) may be converted into a predetermined concave spherical wave in the relay optical system RLk, and may then enter the amplifier PAk through the input window WIk as a seed laser beam SLk. The seed laser beam SLk may then form a beam waist at a central position in the discharge tube DTk1. As a result, the seed laser beam SLk may pass through the discharge tube DTk1 and be amplified therein without striking the inner surface of the discharge tube DTk1.

Then, the seed laser beam SLk may be incident sequentially on the concave mirrors CMk1 through CMk3 at angles of 45 degrees, respectively. The seed laser beam SLk may be reflected by each of the concave mirrors CMk1 through CMk3 to be converted into a concave spherical wave. As a result, beam waists of the seed laser beam SLk may be formed at central positions of the discharge tubes DTk2 through DTk4, respectively. The seed laser beam SLk may then be amplified when passing through the respective discharge tubes DTk2 through DTk4.

The pulse laser beam amplified when passing through the discharge tube Dtk4 may be outputted through the output window WOk as an amplified laser beam ALk of a predetermined convex spherical wave. The amplified laser beam ALk may then enter the amplifier PA(k+1) through the relay optical system RL(k+1).

Figure 3B:
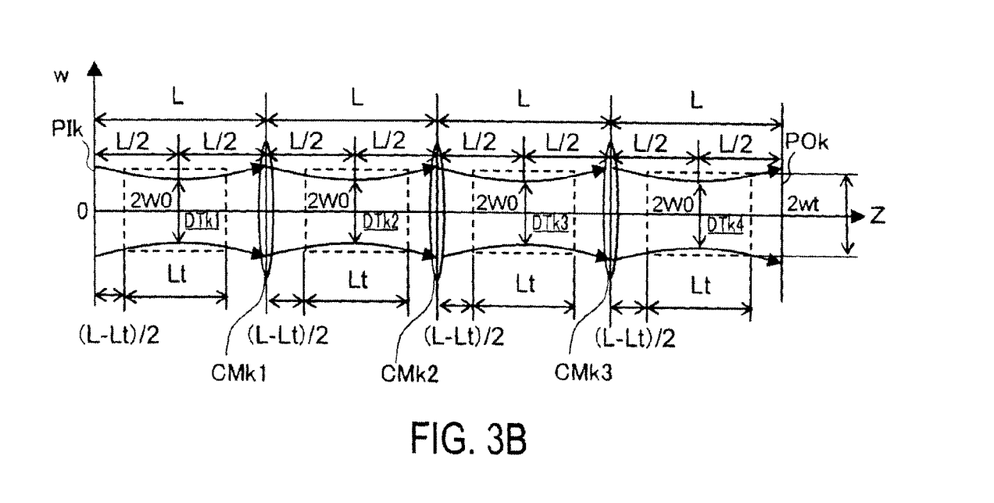
FIG. 3B schematically illustrates an example of an optical system provided in an amplifier and how a laser beam propagates therein.

4.3 Specifications of Reflective Optical System and Propagation of Laser Beam FIG. 3B schematically illustrates an example of an optical system provided in an amplifier and how a pulse laser beam propagates therein. Here, the Z axis and the w axis indicate the direction in which the seed laser beam travels and the radius of a section of the seed laser beam with an optical intensity equal to or higher than a predetermined optical intensity. The predetermined optical intensity herein may, for example, be an intensity of $1/e^2$ with respect to the peak in the intensity distribution. In FIG. 3B, the concave mirrors CMk1 through CMk3 are expressed as equivalent lenses, and the discharge tubes DTk1 through DTk4 are expressed as dotted line rectangles.

The seed laser beam SLk, which is a concave spherical wave, from the relay optical system RLk may enter the discharge tube DTk1 having an inner radius wt. Since the seed laser beam SLk is a concave spherical wave, the seed laser beam SLk may be prevented from vignetting at an edge of the discharge tube DTk1 when entering the discharge tube DTk1. Further, the seed laser beam SLk may form a beam waist having a radius w0 at a position corresponding to a center value Lt/2.

Although the laser beam SLk diverges as a convex spherical wave after forming the beam waist having the radius w0, the seed laser beam SLk may be incident on the concave mirror CMk1 without striking the inner surface of the discharge tube DTk1.

The seed laser beam SLk reflected by the concave mirror CMk1 may then enter the discharge tube DTk2 as a concave spherical wave. Since the seed laser beam SLk is a concave spherical wave, the seed laser beam SLk may be prevented from vignetting at an edge of the discharge tube DTk2. The seed laser beam SLk may then form a beam waist having a radius w0 at a position corresponding to a center value Lt/2 in the discharge tube DTk2. Thereafter, although the seed laser beam SLk diverges as a convex spherical wave after forming the beam waist having the radius w0, the seed laser beam SLk may then be incident on the concave mirror CMk2 without striking the inner surface of the discharge tube DTk2.

Similarly, the seed laser beam SLk reflected by the concave mirror CMk2 may pass through the discharge tube DTk3 while forming a beam waist at a central location in the discharge tube DTk3 and may then be incident on the concave mirror CMk3. The seed laser beam SLk reflected by the concave mirror CMk3 may then pass through the discharge tube DTk4 while forming a beam waist at a central location in the discharge tube DTk4.

The specifications of the concave mirrors CMk1 through CMk3 for forming the seed laser beam SLk as described above can be found through the following equations. Generally speaking, the curvature radius of the wavefront and the beam radius ($1/e^2$) of a Gaussian laser beam having a given $M^2$ value may be expressed by the following equations.

$$w(z_t) = w_0 \left[ 1 + \left( \frac{z_t M^2 \lambda}{\pi w_0^2} \right) \right]^{1/2} \quad (1)$$

$$R(z_t) = z_t \left[ 1 + \left( \frac{\pi w_0^2}{Z_t M^2 \lambda} \right) \right] \quad (2)$$

Here, $Z_t$ indicates a propagation distance from a location where the wavefront is planar, $\lambda$ indicates a wavelength of the pulse laser beam, $w_0$ indicates a beam radius of a section having an optical intensity of $1/e^2$ at a location where the wavefront is planar, $w(Z_t)$ indicates a beam radius of a section having an optical intensity of $1/e^2$ after traveling a distance $Z_t$, and $R(Z_t)$ indicates a curvature radius of the wavefront after traveling a distance $Z_t$. the $M^2$ factor is, as mentioned earlier, called the times-diffraction-limit, and in a single transverse mode, $M^2=1$.

For example, the range of the $M^2$ factor and the range of a radius we of a section of the seed laser beam SLk having an optical intensity of $1/e^2$ at the edges of the respective discharge tubes DTk1 through DTk4 may be set in the following ranges.

$1 \leq M^2 \leq 2$ and $wt/2 \leq we \leq wt$

The beam waist radius $w_0$ may be found as $w(Z_t)=wt$ or $wt/2$ by taking $M^2=1$ or 2 and substituting $Z_t=Lt/2$ in Equation (1). The curvature radius Rm of the wavefront of the seed laser beam SLk to be incident on a concave mirror CMk may be found from the beam waist radius $w_0$ found through Equation (1), by substituting $Z_t=L/2$ in Equation (2).

For example, Equations (1) and (2) may be used to find the curvature radius Rm of the convex spherical wave to be incident on the concave mirror CMk under conditions where the wavelength λ is 10.6 the inter-concave mirror distance L is 1 m, the length Lt of each of the discharge tubes DTk1 through DTk4 is 0.8 m, and the inner radius wt of each of the discharge tubes DTk1 through DTk4 is 0.015 m.

Under conditions where the $M^2$ value is 1 and the radius we is 0.015 m, the beam waist radius $w_0$ may be 0.015 m, and the curvature radius Rm of the wavefront may be 8894 m.

Under conditions where the $M^2$ value is 1 and the radius we is 0.0075 m, the beam waist radius $w_0$ may be 0.007498 m, and the curvature radius Rm of the wavefront may be 555.8 m.

Under conditions where the $M^2$ value is 2 and the radius we is 0.015 m, the beam waist radius $w_0$ may be 0.01499 m, and the curvature radius Rm of the wavefront may be 1110 m.

Under conditions where the $M^2$ value is 2 and the radius we is 0.0075 m, the beam waist radius $w_0$ may be 0.007491 m, and the curvature radius Rm of the wavefront may be 138.8 m.

As described above, the range of the curvature radius Rm of the spherical wave laser beam that is incident on and is reflected by the concave mirror CMk may be 138.8 m≤Rm≤8894 m.

Here, the specifications of the concave mirrors CMk may be such that a laser beam of a convex spherical wave having the curvature radius Rm that is incident at an angle of 45 degrees is reflected and converted into a laser beam of a concave spherical wave having the curvature radius Rm.

4.4 Concave Mirror for Transferring Image of Point Light Source

4.4.1 Configuration

Figure 4:
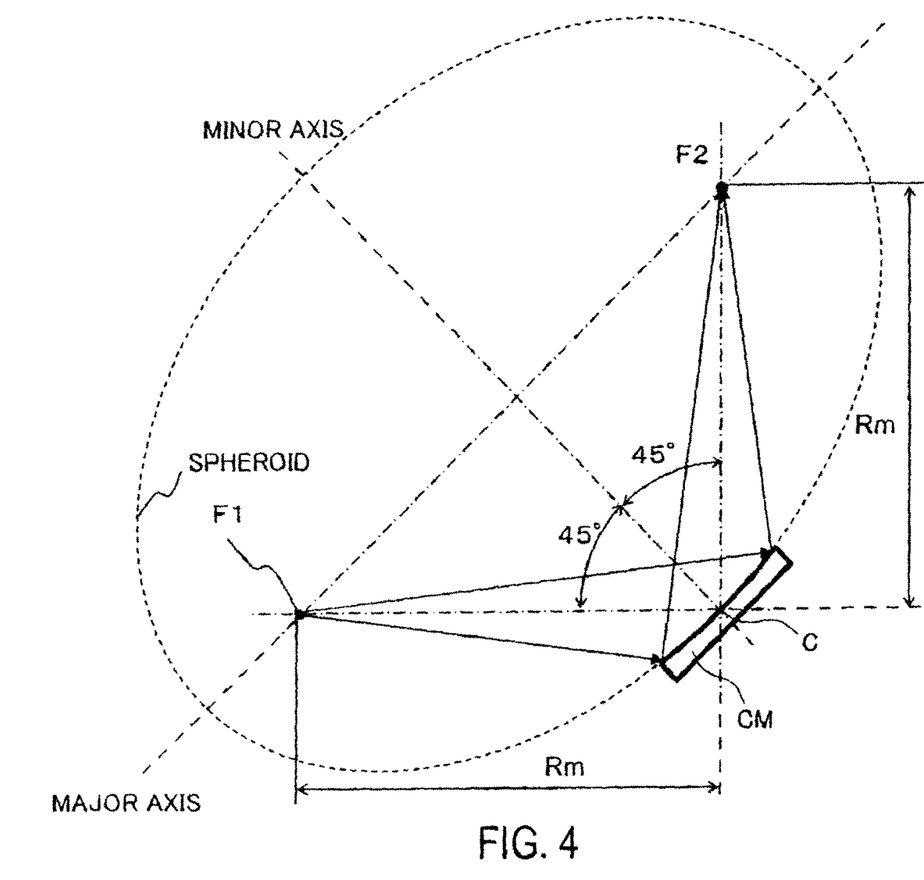
FIG. 4 schematically illustrates an example of a concave mirror having a spheroidal reflective surface.

FIG. 4 schematically illustrates an example of a spheroidal concave mirror. As shown in FIG. 4, the reflective surface of the spheroidal concave mirror may follow along part of a spheroid.

A distance between a first focal point F1 of the spheroid and a center C of the concave mirror CM, shown as a line segment F1-C, and a distance between the center C of the concave mirror CM and a second focal point F2, shown as a line segment C-F2, may be the same Rm. Meanwhile, the angle formed by the line segment F1-C and the line segment C-F2 may be 90 degrees.

4.4.2 Operation

A point light source provided at the position of the focal point F1 may propagate as a convex spherical wave, and the convex spherical wave may be incident on the concave mirror CM at an angle of 45 degrees. The curvature radius of the spherical wave that reaches the center position C of the concave mirror CM may be Rm.

The light reflected by the concave mirror CM at an angle of 45 degrees may be converted into a concave spherical wave. The curvature radius of the spherical wave at this time may be Rm.

4.4.3 Effect

The concave mirror CM having spheroidal reflective surface may transfer an image of a point light source located at the first focal point F1 onto the location of the second focal point F2. The concave mirror CM may reflect the convex spherical wave having the curvature radius Rm to convert into a concave spherical wave having the curvature radius Rm. Such concave mirror CM may be used as a mirror in an amplifier PA.

4.4.4 Variation

As a variation of the concave mirror CM for transferring an image of a point light source located at the first focal point F1 onto the location of the second focal point F2, a toroidal surface may be employed. With the toroidal surface, the shape of the reflective surface of the concave mirror CM may be such that the curvature radii in the horizontal direction and the vertical direction may differ from each other.

5. Variations of Amplifier

5.1 Amplifier Including Plane Mirror and Concave Mirror

5.1.1 Configuration

Figure 5A:
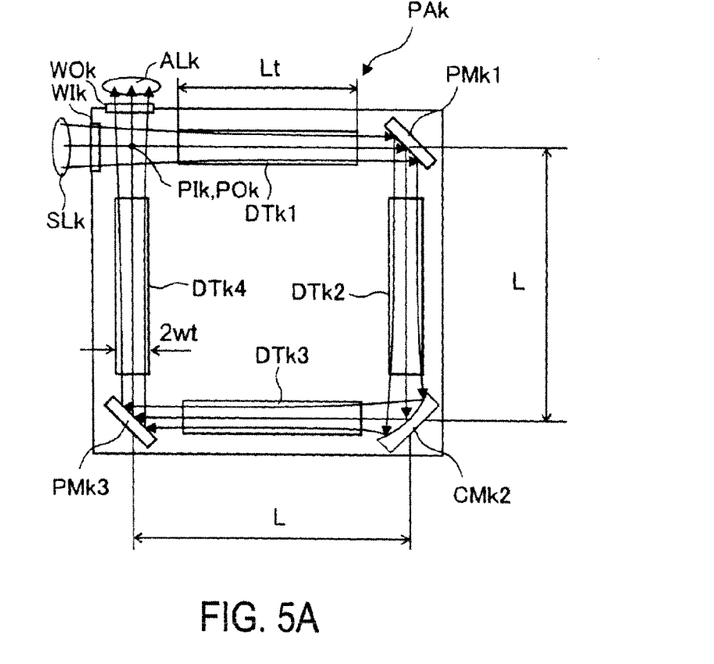
FIG. 5A schematically illustrates an exemplary configuration of an amplifier that includes a plurality of discharge tubes, plane mirrors, and a concave mirror.

FIG. 5A schematically illustrates an exemplary configuration of an amplifier that includes a plurality of discharge tubes, plane mirrors, and a concave mirror.

Configurations that are different from the example shown in FIG. 3A will be described hereinafter. In place of the concave mirrors CMk1 and CMk3, plane mirrors PMk1 and PMk3 may be provided between the discharge tube DTk1 and the discharge tube DTk2 and between the discharge tube DTk3 and the discharge tube DTk4, respectively, to steer the seed laser beam SLk to travel along a predetermined path.

As in the example shown in FIG. 3A, the concave mirror CMk2 may be provided between the discharge tube DTk2 and the discharge tube DTk3 to steer the seed laser beam to travel along a predetermined path. The center axes in the predetermined optical paths may lie in the same plane.

The shape of the reflective surface of the concave mirror CMk2 may be such that the beam waist of the seed laser beam SLk corresponds to the positions of the plane mirror PMk1 and the plane mirror PMk3.

The configurations of the amplifier PA(k−1), the relay optical system RLk, the relay optical system RL(k+1), and the amplifier PA(k+1) (none of which are shown) may be the same as in the example shown in FIG. 3A. An optical system for converting the seed laser beam SLk from the amplifier PA(k−1) into such a concave spherical wave that forms a beam waist at the position of the plane mirror PMk1 may be used as the relay optical system RLk.

5.1.2 Operation

The pulse laser beam from the amplifier PA(k−1) (not shown) may enter the amplifier PAk through the relay optical system RLk and the input window WIk as a seed laser beam SLk of a predetermined concave spherical wave. The seed laser beam SLk may then be amplified when passing through the discharge tube DTk1.

The seed laser beam SLk may be incident on the plane mirror PMk1 at an angle of 45 degrees. At this point the seed laser beam SLk may form a beam waist at the plane mirror PMk1. The seed laser beam SLk may be reflected by the plane mirror PMk1, resulting in a convex spherical wave. The seed laser beam SLk may then pass through the discharge tube DTk2 without striking the inner surface of the discharge tube DTk2, and may be amplified when passing through the discharge tube DTk2.

The seed laser beam SLk that has passed through the discharge tube DTk2 may be incident on the concave mirror CMk2 as a convex spherical wave at an angle of 45 degrees, and may be reflected as a concave spherical wave. The seed laser beam SLk may then enter the discharge tube DTk3 such that no vignetting occurs at an edge of the discharge tube DTk3, and may be amplified when passing through the discharge tube DTk3.

The seed laser beam SLk that has passed through the discharge tube DTk3 may be incident on the plane mirror PMk3 at an angle of 45 degrees. At this point, the seed laser beam SLk may form a beam waist on the plane mirror PMk3. The seed laser beam SLk may be reflected by the plane or PMk3, resulting in a convex spherical wave. The seed laser beam SLk may then pass through the discharge tube DTk4 without striking the inner surface of the discharge tube DTk4, and may be amplified when passing through the discharge tube DTk4. The pulse laser beam amplified when passing through the discharge tube DTk4 may be outputted through the output window WOk as an amplified laser beam ALk of a predetermined convex spherical wave.

This amplified laser beam ALk may then enter the amplifier PA(k+1) (not shown) through the relay optical system RL(k+1) (not shown).

Figure 5B:
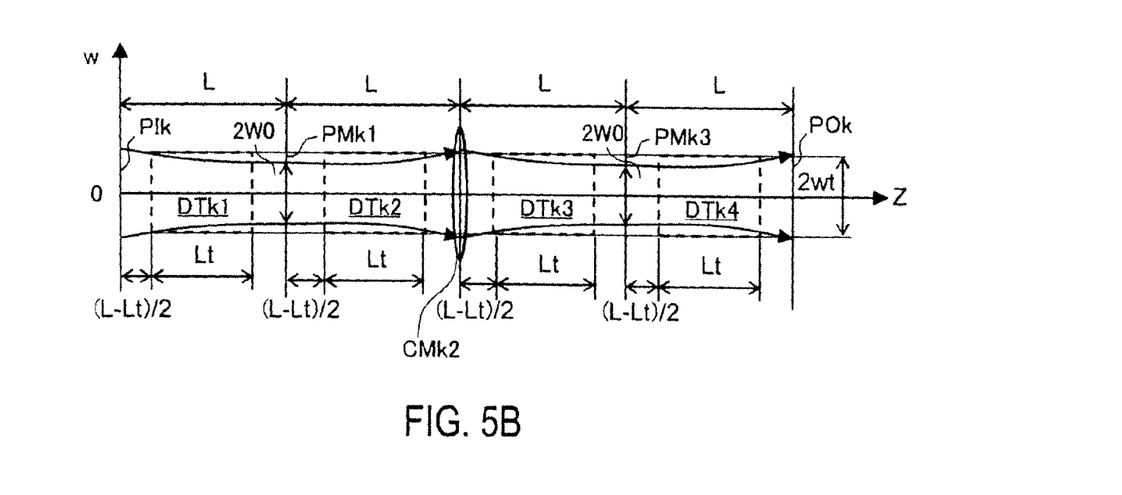
FIG. 5B schematically illustrates an example of an optical system provided in an amplifier and how a laser beam propagates therein.

FIG. 5B schematically illustrates an example of an optical system provided in an amplifier and how a laser beam propagates therein.

The seed laser beam SLk that has passed through an input position PIk (Z=0) of the seed laser beam SLk may enter the discharge tube DTk1 as a concave spherical wave. This seed laser beam SLk may pass through the discharge tube DTk1 and form a beam waist radius w0 at the position of the plane mirror PMk1 (a position where Z=L). The reflected seed laser beam SLk may then pass through the discharge tube DTk2 as a convex spherical wave and be incident on the concave mirror CMk1 at a position Z=2L.

The seed laser beam SLk that is a concave spherical wave reflected by the concave mirror CMk1 may pass through the discharge tube DTk3 and form a beam waist radius w0 at the position of the plane mirror PMk3 (a position where Z=3L). The seed laser beam SLk may then pass through the discharge tube DTk4 as a convex spherical wave and pass through an output position POk of an amplified laser beam ALk at a position Z=4L. Here, the distance from the beam waist to the output-side end of the discharge tube DTk2 may be (L−Lt)/2+Lt.

For example, the range of the $M^2$ value and the range of the radius we of a section of the seed laser beam SLk having an intensity of $1/e^2$ at the position of the output-side end of the discharge tube DTk2 may be set in the following range.

$$1 \leq M^2 \leq 2$$

and $$wt/2 \leq we \leq wt$$

The beam waist radius $w_0$ may be found as $w(Z_t)$=wt or wt/2 by taking $M^2$=1 or 2 and substituting 4=(L−Lt)/2+Lt in Equation (1). The curvature radius Rm of the wavefront incident on the concave mirror CMk may be found from the beam waist radius $w_0$ found through Equation (1), by substituting $Z_t$=L in Equation (2).

For example, Equations (1) and (2) may be used to find the curvature radius Rm of the convex spherical wave to be incident on the concave mirror CMk1 under conditions where the wavelength λ is 10.6 μm, the distance L between the plane mirror PM and the concave mirror CM is 1 m, the length Lt of each of the discharge tubes DTk1 through DTk4 is 0.8 m, and the inner radius wt of the discharge tube DT is 0.015 m.

Under conditions where the $M^2$ value 1 and the radius we is 0.015 m, the beam waist radius $w_0$ may be 0.014998 m, and the curvature radius Rm of the wavefront may be 4445 m.

Under conditions where the $M^2$ value is 1 and the radius we is 0.0075 m, the beam waist radius $w_0$ may be 0.007485 m, and the curvature radius Rm of the wavefront may be 276.7 m.

Under conditions where the $M^2$ value is 2 and the radius we is 0.015 m, the beam waist radius $w_0$ may be 0.014993 m, and the curvature radius Rm of the wavefront may be 1110 m.

Under conditions where the $M^2$ value is 2 and radius we is 0.0075 m, the beam waist radius $w_0$ may be 0.007439 m, and the curvature radius Rm of the wavefront may be 68.24 m.

As described above, the range of the curvature radius Rm of the spherical wave that is incident on and is reflected by the concave mirror CMk1 may be 68.24 m≤Rm≤4445 m.

5.2 Amplifier Including Spherical Concave Mirror
5.2.1 Configuration

Figure 6A:
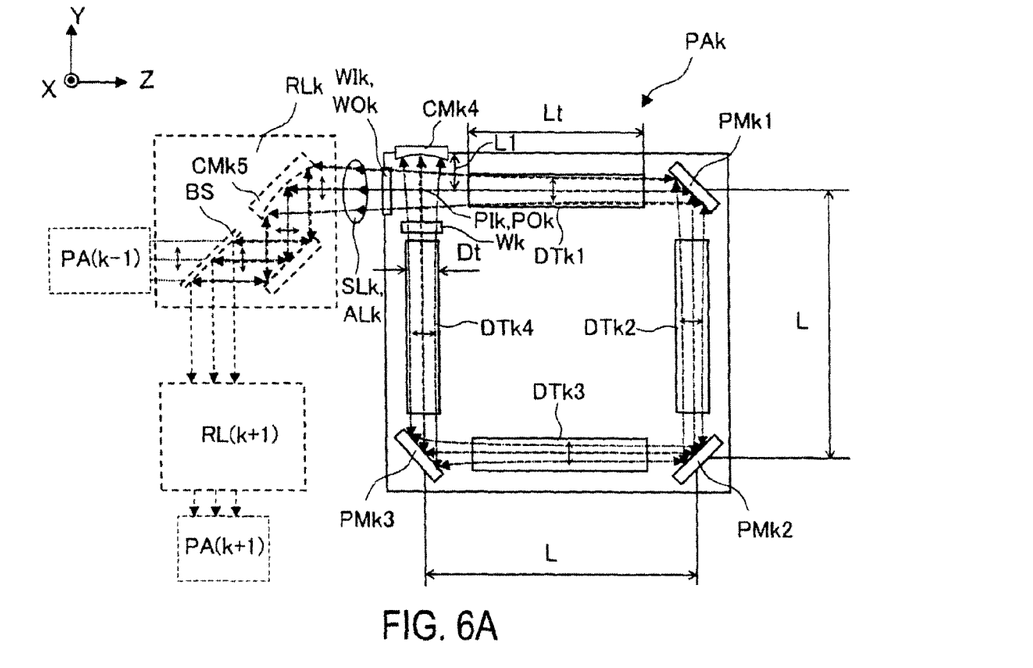
FIG. 6A schematically illustrates an exemplary configuration of a double-pass amplifier that includes a plurality of discharge tubes, plane mirrors, and a concave mirror.

FIG. 6A schematically illustrates an exemplary configuration of a double-pass amplifier that includes a plurality of discharge tubes, planar mirrors, and a concave mirror.

Configurations that are different from the example shown in FIG. 3A will be described hereinafter.

In place of the concave mirrors CMk1 through CMk3, plane mirrors PMk1 through PMk3 may be provided between the discharge tube DTk1 and the discharge tube DTk2, between the discharge tube DTk2 and the discharge tube DTk3, and between the discharge tube DTk3 and the discharge tube DTk4 to steer the seed laser beam SLk to travel along a predetermined path.

A concave mirror CMk4 may be provided so that the pulse laser beam that has passed through the discharge tube DTk4 is incident thereon substantially at normal incidence. The concave mirror CMk4 may be provided at a position distanced by a distance L1 from the input position PIk of the seed laser beam SLk and the output position POk of the amplified laser beam ALk. The shape of the reflective surface of the concave mirror CMk4 may be a spherical surface having a predetermined curvature radius such that the beam waist of the seed laser beam SLk corresponds to the position of the plane mirror PMk2.

In addition, a quarter-wave plate Wk may be provided between the discharge tube DTk4 and the concave mirror CMk4 in the path of the seed laser beam SLk.

The relay optical system RLk may be provided between the amplifier PA(k−1) and the amplifier PAk. The relay optical system RLk may include a concave mirror CMk for converting the seed laser beam SLk from the amplifier PA(k−1) into such a concave spherical wave that forms a beam waist at the position of the plane mirror PMk2. Further, the relay optical system RLk may include a polarization beam splitter BS. A surface of the polarization beam splitter may be coated with a film that configured to transmit a polarization component in the Y direction with high transmittance and reflect a polarization component in the X direction which is orthogonal to the Y direction.

The relay optical system RL(k+1) may be provided between the relay optical system RLk and the amplifier PA(k+1) in a path of the seed laser beam SLk.

5.2.2 Operation

The pulse laser beam from the amplifier PA(k−1) may be linearly-polarized in the Y direction. This pulse laser beam may be transmitted with high transmittance through the polarization beam splitter BS provided in the relay optical system RLk. This pulse laser beam may be converted into a predetermined concave spherical wave by a concave mirror CMk5 provided in the relay optical system RLk, and may enter the amplifier PAk through the input window WIk as the seed laser beam SLk.

The seed laser beam SLk may then pass through the discharge tube DTk1 and may be amplified therein. The seed laser beam SLk may be incident on the plane mirror PMk1 at an angle of 45 degrees, and be reflected toward the discharge tube DTk2. The seed laser beam SLk may pass through the discharge tube DTk2 and may be amplified therein. The seed laser beam SLk may be prevented from striking the inner surface of the discharge tube DTk2 when passing through the discharge tube DTk2.

The seed laser beam SLk that has passed through the discharge tube DTk2 may be incident on the plane mirror PMk2 at an angle of 45 degrees. At this point, the seed laser beam SLk may form a beam waist. This seed laser beam SLk may then be reflected by the plane mirror PMk2 at an angle of 45 degrees. The seed laser beam SLk may pass through the discharge tube DTk3 as a convex spherical wave and may be amplified therein. When the seed laser beam SLk passes through the discharge tube DTk3, the seed laser beam SLk may be prevented from striking the inner surface of the discharge tube DTk3.

The seed laser beam SLk that has passed through the discharge tube DTk3 may be incident on the plane mirror PMk3 at an angle of 45 degrees, and may be reflected at an angle of 45 degrees. The seed laser beam SLk may be amplified when passing through the discharge tube DTk4. When the seed laser beam SLk passes through the discharge tube DTk4, the seed laser beam SLk may be prevented from striking the inner surface of the discharge tube DTk4.

The seed laser beam SLk that has been amplified when passing through the discharge tube DTk4 may then be converted into a circular polarized seed laser beam SLk by passing through the quarter-wave plate Wk. The circular polarized seed laser beam SLk may be incident on the concave mirror CMk4 as a convex spherical wave of a predetermined curvature radius, and may be reflected to be converted into a concave spherical wave of the same curvature radius as the mirror.

This circular polarized seed laser beam SLk may then be converted into a linearly-polarized seed laser beam SLk in the X direction by passing through the quarter-wave plate Wk again. This seed laser beam SLk may be amplified through the discharge tube DTk4, the plane mirror PMk3, the discharge tube DTk3, the plane mirror PMk2, the discharge tube DTk2, the plane mirror PMk1, and the discharge tube DTk1.

Here, the position of the beam waist of the seed laser beam SLk may correspond to the position of the plane mirror PMk2. When the seed laser beam SLk passes through the discharge tubes DTk1 through DTk4, the seed laser beam SLk may be prevented from striking the inner surfaces of the discharge tubes DTk1 through DTk4.

Figure 6B:
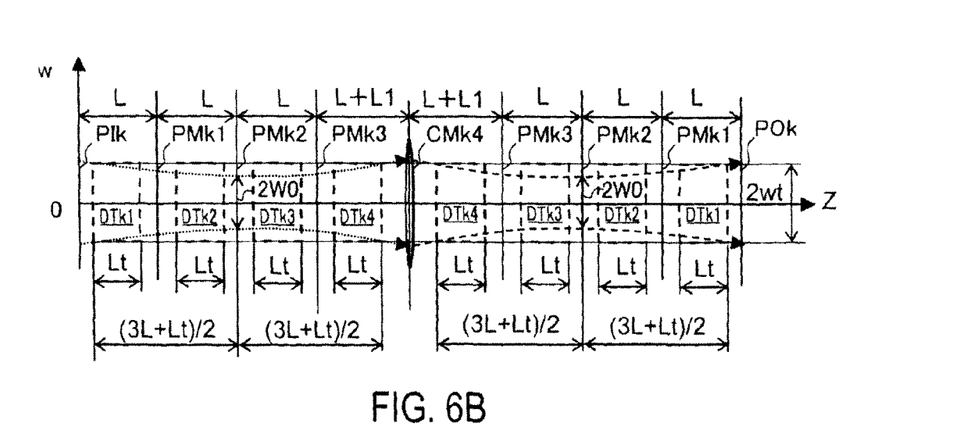
FIG. 6B schematically illustrates an example of an optical system provided in an amplifier and how a laser beam propagates therein.

FIG. 6B schematically illustrates an example of an optical system provided in an amplifier and how a pulse laser beam propagates therein.

The seed laser beam SLk that has passed through the input position PIk (Z=0) may be incident on the plane mirror PMk2, as a concave spherical wave, through the discharge tube DTk1, the plane mirror PMk1, and the discharge tube DTk2. This seed laser beam SLk may form a beam waist having the radius w0 at the position of the plane mirror PMk2 (a position where Z=2L). The seed laser beam SLk reflected by the plane mirror PMk2 may then travel through the discharge tube DTk3, the plane mirror PMk3, and the discharge tube DTk4 as a convex spherical wave, and be incident on the concave mirror CMk4 at a position where Z=4L+L1.

The seed laser beam SLk may be reflected by the concave mirror CMk4 to travel through the discharge tube DTk4, the plane mirror PMk3, and the discharge tube DTk3 as a concave spherical wave, and may form a beam waist having the radius w0 at the position of the plane mirror PMk2 (a position where Z=6L+2L1). The seed laser beam SLk reflected by the plane mirror PMk2 may then travel through the discharge tube DTk2, the plane mirror PMk1, and the discharge tube DTk1 as a convex spherical wave, and pass through the output position POk at a position where Z=8L+2L1. Here, the distance from the position of the beam waist (i.e., the plane mirror PMk2) to the output-side end of the discharge tube DTk4 may be 2L−(L−Lt)/2=(3L+Lt)/2.

For example, the range of the $M^2$ value and the range of the radius of a section of the seed laser beam SLk having an intensity of $1/e^2$ at the position of the output-side end of the discharge tube DTk4 may be set in the following range.

$$1 \leq M^2 \leq 2$$

and $$wt/2 \leq we \leq wt$$

The beam waist radius $w_0$ may be found as $w(Z_t)=wt$ or $wt/2$ by substituting $Z_t=(3L+Lt)/2$ in Equation (1). The curvature radius Rm of the wavefront to be incident on the concave mirror CMk4 may be found from the beam waist radius $w_0$ found through Equation (1), by substituting $Z_t=2L+L1$ in Equation (2).

For example, Equations (1) and (2) may be used to find the curvature radius Rm of the convex wavefront to be incident on the concave mirror CMk1 under conditions where the wavelength λ is 10.6 μm, the distance L between the plane mirror PMk and the concave mirror CMk is 1 m, the length Lt of each of the discharge tubes DTk1 through DTk4 is 0.8 m, the inner radius wt of the discharge tube DTk is 0.015 m, and L1 is 0.1 m.

Under conditions where the $M^2$ value is 1 and the radius we is 0.015 m, the beam waist radius $w_0$ may be 0.014994 m, and the curvature radius Rm of the wavefront may be 2116 m.

Under conditions where the $M^2$ value is 1 and the radius we is 0.0075 m, the beam waist radius $w_0$ may be 0.007448 m, and the curvature radius Rm of the wavefront may be 130.8 m.

Under conditions where the $M^2$ value is 2 and the radius we is 0.015 m, the beam waist radius $w_0$ may be 0.014974 m, and the curvature radius Rm of the wavefront may be 527.8267 m.

Under conditions where the $M^2$ value is 2 and the radius we is 0.0075 m, the beam waist radius $w_0$ may be 0.007279 m, and the curvature radius Rm of the wavefront may be 31.45 m.

As described above, the range of the curvature radius Rm of the spherical wave that is incident on and is reflected by the concave mirror CMk1 may be 31.45 m ≤ Rm ≤ 2116 m.

Here, the concave mirror CMk4 is a normal incidence concave mirror, and thus the shape of the reflective surface of the concave mirror CMk4 may be a spherical surface having the curvature radius Rm.

Figure 7A:
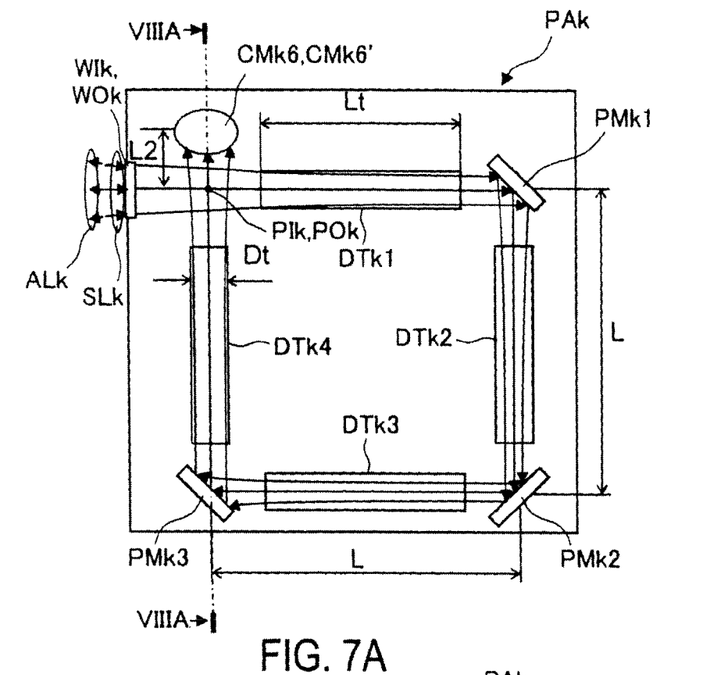
FIG. 7A schematically illustrates an exemplary configuration of an amplifier that includes a plurality of discharge tubes, plane mirrors, and a concave mirror.
Figure 7B:
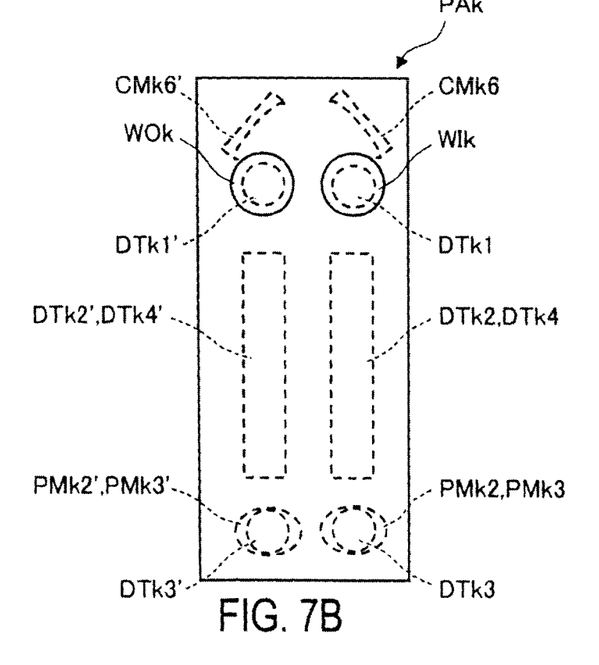
FIG. 7B is a side view of the amplifier shown in FIG. 7A.
Figure 8A:
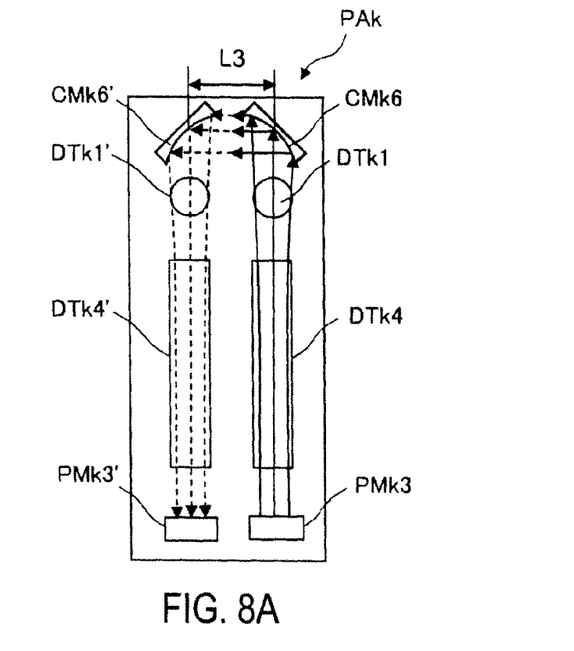
FIG. 8A is a sectional view of the amplifier shown in FIG. 7A, taken along VIIIA-VIIIA plane.
Figure 8B:
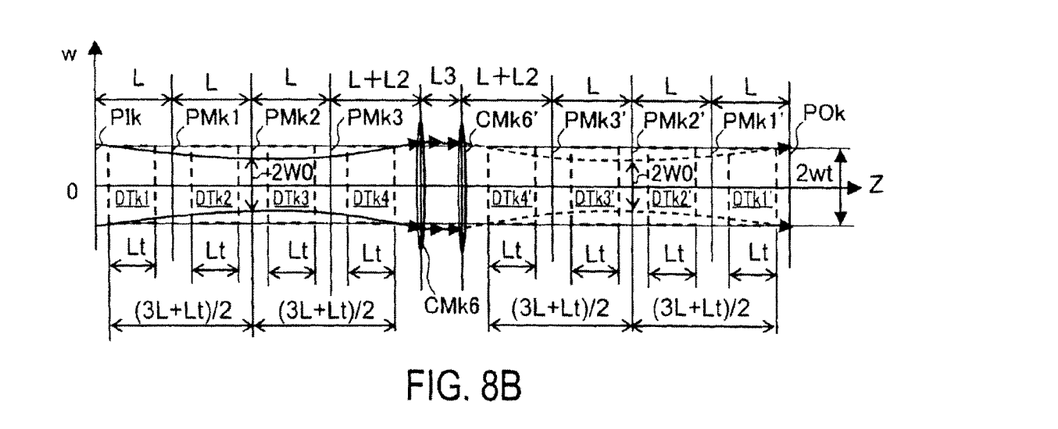
FIG. 8B schematically illustrates an example of an optical system provided in an amplifier and how a laser beam propagates therein.

5.3 Amplifier Including Off-Axis Paraboloidal Concave Mirror 5.3.1 Configuration FIG. 7A schematically illustrates an exemplary configuration of an amplifier that includes a plurality of discharge tubes, planar mirrors, and a concave mirror. FIG. 7B is a side view of the amplifier shown in FIG. 7A. FIG. 8A is a sectional view of the amplifier shown in FIG. 7A, taken along VIIIA-VIIIA plane. FIG. 8B schematically illustrates an optical system provided in an amplifier and how a laser beam propagates therein.

The amplifier PAk may include the input window WIk, the output window WOk, discharge tubes DTk1 and DTk1', plane mirrors PMk1 and PMk1', discharge tubes 2 and 2', plane mirrors PMk2 and PMk2', discharge tubes DTk3 and DTk3', plane mirrors PMk3 and PMk3', discharge tubes DTk4 and DTk4', and concave mirrors CMk6 and CMk6'.

The discharge tubes DTk1 through DTk4 and the discharge tubes DTk1' through DTk4' may be provided in a first path and a second path, respectively. The center axes of the first and second paths may be in planes that are parallel to each other.

The plane mirror PMk1 may be provided between the discharge tube DTk1 and the discharge tube DTk2. The plane mirror PMk1' may be provided between the discharge tube DTk1' and the discharge tube DTk2'. Thus, the first and second paths may be formed, respectively. Similarly, the plane mirror PMk2 may be provided between the discharge tube DTk2 and the discharge tube DTk3. The plane mirror PMk2' may be provided between the discharge tube DTk2' and the discharge tube DTk3'. Thus, the first and second paths may be formed, respectively. The plane mirror PMk3 may be provided between the discharge tube DTk3 and the discharge tube DTk4. The plane mirror PMk3' may be provided between the discharge tube DTk3' and the discharge tube DTk4'. Thus, the first and second paths may be formed, respectively.

The concave mirrors CMk6 and CMk6' may be provided to form a path that connects the first and second paths. The concave mirror CMk6 may be provided at a position distanced by a distance L2 from the input position PIk of the seed laser beam SLk. Further, the concave mirror CMk6' may be provided at a position distanced by a distance L2 from the output position POk of the amplified laser beam ALk. The concave mirror CMk6 and the concave mirror CMk6' may be distanced from each other by a distance L3.

The concave mirror CMk6 may be an off-axis paraboloidal mirror that converts a convex spherical wave of the seed laser beam SLk into a plane wave.

The concave mirror CMk6' may be an off-axis paraboloidal mirror that converts a plane wave of the seed laser beam SLk into such a concave spherical wave that the beam waist position corresponds to the plane mirror PMk2'.

The configurations of the amplifier PA(k−1), the relay optical system RLk, the relay optical system RL(k+1), and the amplifier PA(k+1) (none of which are shown) may be the same as those shown in FIG. 3. An optical system that converts the pulse laser beam from the amplifier PA(k−1) into such a convex spherical wave that forms a beam waist at the position of the plane mirror PMk2 may be used as the relay optical system RLk.

5.3.2 Operation

A pulse laser beam from the amplifier PA(k−1) may be converted into a predetermined concave spherical wave by an optical system provided in the relay optical system RLk (not shown), and may enter the amplifier PAk through the input window WIk as the seed laser beam SLk. The seed laser beam SLk may then be amplified when passing through the discharge tube DTk1.

The seed laser beam SLk may be incident on the plane mirror PMk1 at an angle of 45 degrees, and may be reflected thereby. The reflected seed laser beam SLk may be amplified by passing through the discharge tube DTk2. When the seed laser beam SLk passes through the discharge tube DTk2, the seed laser beam SLk may be prevented from striking the inner surface of the discharge tube DTk2.

The seed laser beam SLk that has passed through the discharge tube DTk2 may be incident on the plane mirror PMk2 at an angle of 45 degrees and may form a beam waist at the position of the plane mirror PMk2. This seed laser beam SLk may then be reflected at an angle of 45 degrees and may be amplified by passing through the discharge tube DTk3 as a convex spherical wave. When the seed laser beam SLk passes through the discharge tube DTk3, the seed laser beam SLk may be prevented from striking the inner surface of the discharge tube DTk3.

The seed laser beam SLk that has passed through the discharge tube DTk3 may be incident on the plane mirror PMk3 at an angle of 45 degrees, and may be reflected thereby at an angle of 45 degrees. The seed laser beam SLk may then be amplified by passing through the discharge tube DTk4. When the seed laser beam SLk passes through the discharge tube DTk4, the seed laser beam SLk may be prevented from striking the inner surface of the discharge tube DTk4.

The seed laser beam SLk that has passed through the discharge tube DTk4 may be incident on the concave mirror CMk6 as a convex spherical wave at an angle of 45 degrees, and may be reflected to be converted into a plane wave. This plane wave seed laser beam SLk may then be incident on the concave mirror CMk6' at an angle of 45 degrees, and may be reflected to be converted into a concave spherical wave of a predetermined curvature radius.

This seed laser beam SLk may be amplified through the discharge tube DTk4', the plane mirror PMk3', the discharge tube DTk3', the plane mirror PMk2', the discharge tube DTk2', the plane mirror PMk1', and the discharge tube DTk1', and may be outputted through via the output window WOk as the amplified laser beam ALk.

Here, the beam waist of the seed laser beam SLk may be formed at a position corresponding to the position of the plane mirror PMk2. The seed laser beam SLk may be prevented from vignetting at the input end of the discharge tube DTk1' when the seed laser beam SLk passes through the discharge tubes DTk4' through DTk1'. Further, the seed laser beam SLk may be prevented from striking the inner surface of the discharge tube DTk4'.

The above operation will be described with reference to the schematic diagram of the beam propagation shown in FIG. 8B. The seed laser beam SLk that has passed through the input position PIk ($Z=0$) may be incident on the plane mirror PMk2, as a concave spherical wave, through the discharge tube DTk1, the plane mirror PMk1, and the discharge tube DTk2. This seed laser beam SLk may form a beam waist having the radius w0 at the position of the plane mirror PMk2 (a position where $Z=2L$).

The seed laser beam SLk reflected by the plane mirror PMk2 may then travel through the discharge tube DTk3, the plane mirror PMk3, and the discharge tube DTk4 as a convex spherical wave and be incident on the concave mirror CMk6 at a position where $Z=4L+L2$.

The seed laser beam SLk reflected by the concave mirror CMk6 may be converted into a plane wave. This plane wave seed laser beam SLk may be converted into a concave spherical wave by the concave mirror CMk6' at a position where $Z=4L+L2+L3$.

The seed laser beam SLk may travel through the discharge tube DTk4', the plane mirror PMk3', and the discharge tube DTk3' and form a beam waist having the radius w0 at the position of the plane mirror PMk2' (a position where $Z=6L+2L2+L3$). This reflected seed laser beam SLk may then pass through the discharge tube DTk2', the plane mirror PMk1', and the discharge tube DTk as a convex spherical wave and pass through the output position POk at a position where $Z=8L+2L2+L3$. Here, the distance from the position of the beam waist (the plane mirror PMk2') to the output-side end of the discharge tube DTk1' is $(3L+Lt)/2$.

For example, the range of the $M^2$ value and the range of the radius of a section of the seed laser beam SLk having an intensity of $1/e^2$ at the position of the output-side end of the discharge tube DTk4 may be set in the following range.

$$1 \leq M^2 \leq 2$$

and $$wt/2 \leq we \leq wt$$

The radius $w_0$ of the beam waist may be found as $w(Z_t)=wt$ or $wt/2$ by substituting $Z_t=(3L+Lt)/2$ in Equation (1).

The curvature radius Rm of the wavefront to be incident on the concave mirror CMk6 may be found from the beam waist radius $w_0$ found through Equation (1), by substituting $Z_t=2L+L2$ in Equation (2).

For example, Equations (1) and (2) may be used to find the curvature radius Rm of the convex spherical wave to be incident on the concave mirror CMk6 under conditions where the wavelength $\lambda$ is 10.6 μm, the distance L between the plane mirror PM and the concave mirror CM is 1 m, the length Lt of each of the discharge tubes DTk1 through DTk4 is 0.8 m, the inner radius wt of the discharge tube DT is 0.015 m, and L2 is 0.1 m.

Under conditions where the $M^2$ value is 1 and the radius we is 0.015 m, the beam waist radius $w_0$ may be 0.014994 m, and the wavefront curvature radius Rm may be 2116 m.

Under conditions where the $M^2$ value is 1 and the radius we is 0.0075 m, the beam waist radius $w_0$ may be 0.007448 m, and the wavefront curvature radius Rm may be 130.8 m.

Under conditions where the $M^2$ value is 2 and the radius we is 0.015 m, the beam waist radius $w_0$ may be 0.014974 m, and the wavefront curvature radius Rm may be 527.8267 m.

Under conditions where the $M^2$ value is 2 and the radius we is 0.0075 m, the beam waist radius $w_0$ may be 0.007279 m, and the wavefront curvature radius Rm may be 31.45 m.

As described above, the range of the curvature radius Rm of the spherical wave to be incident on the concave mirror CMk6 may be 31.45 m≤Rm≤2116 m.

Here, by reflecting the seed laser beam SLk by the concave mirror CMk6 and the concave mirror CMk6', a convex spherical wave seed laser beam SLk having a curvature radius Rm can be converted into a concave spherical wave seed laser beam SLk having a curvature radius Rm. Accordingly, each of the concave mirrors CMk6 and CMk6' may be an off-axis paraboloidal mirror with an angle of incidence of 45 degrees and a focal distance Rm.

The above-described examples and the modifications thereof are merely examples for implementing the present disclosure, and the present disclosure is not limited thereto. Making various modifications according to the specifications or the like is within the scope of the present disclosure, and other various examples are possible within the scope of the present disclosure. For example, the modifications illustrated for particular ones of the examples can be applied to other examples as well (including the other examples described herein).

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as "at least one" or "one or more."

What is claimed is:

1. An amplifier, comprising:
a plurality of discharge tubes arranged between a first position and a second position in a path of a seed laser beam forming a beam waist, the first position being an input position from which the seed laser beam enters the amplifier and the second position being an output position from which the seed laser beam exists the amplifier; and
a reflective optical system arranged between the plurality of discharge tubes in the path such that a central position between the first position and the reflective optical system in the path is transferred onto a central position between the reflective optical system and the second position in the path.

2. The amplifier according to claim 1, wherein the reflective optical system includes a spheroidal concave mirror.

3. The amplifier according to claim 1, wherein the reflective optical system includes a toroidal mirror.

4. The amplifier according to claim 1, wherein the reflective optical system includes an off-axis paraboloidal mirror.

5. The amplifier according to claim 1, wherein the reflective optical system includes a spherical mirror.

6. The laser apparatus, comprising:
a master oscillator configured to output a seed laser beam; and
the amplifier according to claim 1.

7. An extreme ultraviolet light generation system, comprising:
the laser apparatus according to claim 6;
a chamber provided with an inlet arranged such that a laser beam from the laser apparatus may enter the chamber;
a target supply device configured to supply a target material into the chamber; and
a focusing optical system positioned to focus the laser beam at a predetermined position inside the chamber.

8. The amplifier according to claim 1,
wherein the plurality of discharge tubes are arranged in order along the path.

9. The amplifier according to claim 8,
wherein the plurality of discharge tubes are arranged at a same interval in the path.

10. The amplifier according to claim 1, wherein:
a first group of the plurality of discharge tubes is arranged between the first position and the reflective optical system in the path;
a second group of the plurality of discharge tubes is arranged between the reflective optical system and the second position in the path;
a beam waist is formed at a central position between an input-sided end of a discharge tube closest to the input side of the first group and an output-sided end of a discharge tube closest to the output side of the first group; an
a beam waist is formed at a central position between an input-sided end of a discharge tube closest to the input side of the second group and an output-sided end of a discharge tube closest to the output side of the second group.

11. The amplifier according to claim 1,
wherein the beam waist is formed at a central position between an input-sided end and an output-sided end of each of the plurality of discharge tubes in the path.

12. The amplifier according to claim 11, wherein:
a first group of the plurality of discharge tubes is arranged between the first position and the reflective optical system in the path;
a second group of the plurality of discharge tubes is arranged between the reflective optical system and the second position in the path; and
other reflective optical systems than the reflective optical system are provided between the discharge tubes of the first group and between the discharge tubes of the second group, respectively, each of the other reflective optical systems transferring the beam waist.

13. The amplifier according to claim 1,
wherein the reflective optical system includes a plurality of mirrors.

14. An amplifier comprising:
a plurality of discharge tubes arranged in a path of a seed laser beam; and
a reflective optical system provided between the plurality of discharge tubes such that the seed laser beam forms a designed path, and configured to focus a point light source at a predetermined position.

* * * * *